C. W. STEGNER.
COW TAIL HOLDER.
APPLICATION FILED SEPT. 12, 1912.
1,078,808.
Patented Nov. 18, 1913.
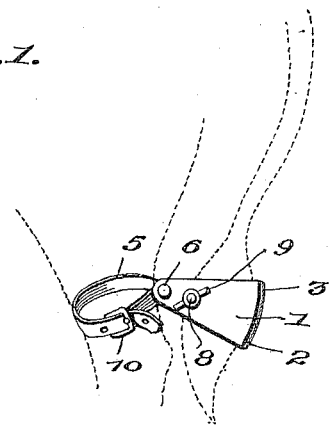
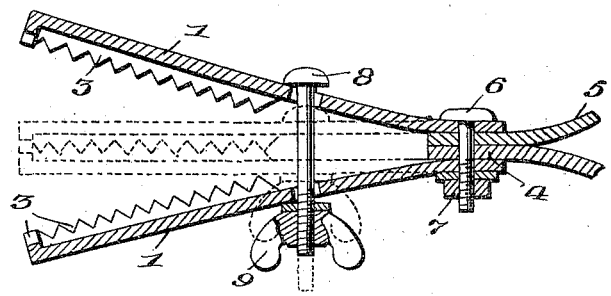

UNITED STATES PATENT OFFICE.

CLAYTON W. STEGNER, OF NERSTRAND, MINNESOTA.

COW-TAIL HOLDER.

1,078,808.     Specification of Letters Patent.     Patented Nov. 18, 1913.

Application filed September 12, 1912. Serial No. 720,033.

*To all whom it may concern:*

Be it known that I, CLAYTON W. STEGNER, a citizen of the United States, residing at Nerstrand, in the county of Rice and State of Minnesota, have invented certain new and useful Improvements in Cow-Tail Holders, of which the following is a specification, reference being had to the accompanying drawings.

This invention relates to new and useful improvements in cow tail holders and has for its primary object to provide a device of this character whereby the tail of the animal may be securely held so that the cow will be prevented from switching her tail during milking.

A further object of the invention is to provide a device of the above stated character which can be readily attached and clamped to the shredded portion of the tail and which may be readily and effectively connected to the leg of the animal.

A still further object of the invention is to provide a cow tail holder which will be of simple and inexpensive construction, of durable and substantial design and one which can be readily and effectively attached and detached.

With these and other objects in view, as will appear as the description proceeds, the invention comprises the various novel features of construction, combination and arrangement of parts as will be more fully described hereinafter and set forth in the appended claims.

Referring to the drawings, Figure 1 is a view showing my improved cow tail holder in applied position; and Fig. 2 is a horizontal sectional view through the device.

Similar characters of reference are used to denote like parts throughout the accompanying drawings and the annexed specification.

Referring more particularly to the drawings, the reference numeral 1 indicates a pair of substantially triangular clamping plates which are of curved formation at one end thereof, as shown at 2. This end 2 and the upper and lower longitudinal sides of each of the plates are provided with inwardly extending toothed flanges 3 which latter are adapted to interlock over the shredded portion of the tail when the plates are brought into clamping position. The opposite longitudinal ends of these plates are apertured and have arranged between them the terminal ends 4 of a securing strap 5, a bolt 6 being passed through the plates and the terminal ends of the strap and provided with a nut 7, whereby said parts may be connected together.

Each of the clamping plates 1 are provided with alining apertures at points adjacent their pivotal connection through which a clamping bolt 8 is passed and is provided at one end thereof with a wing nut 9 through the medium of which the plates 1 may be either clamped or unclamped from the animal's tail in a ready and easy manner.

When it is desired to use the cow-tail holder, the clamping plates 1 are opened by unscrewing the wing nut 9 upon the bolt 8 and the shredded portion of the cow's tail inserted between the toothed ends of the plates, after which the plates may be brought into clamping engagement over the tail by screwing the nut 9 up upon the bolt 8. The clamp having been secured in position upon the animal's tail, the securing strap 5 is buckled around the animal's leg through the medium of a suitable buckle 10 secured to the terminal end of one of the strap sections. The clamp having been arranged in position, it will be apparent that the animal will be prevented from switching its tail and thus eliminating a considerable source of annoyance to the milker or persons that happen to be near the cow.

From the foregoing description taken in connection with the accompanying drawings, the advantages of construction and the method of operation will be apparent to those skilled in the art to which the invention relates, and while I have described the principle of the operation of the invention, together with the device which I now consider to be the best embodiment thereof, I desire to have it understood that the device shown is merely illustrative and that such changes may be made when desired, as are within the scope of the appended claims.

Having thus fully described my invention, what I claim as new is:—

1. A cow tail holder comprising oppositely and outwardly curved plates, means for connecting the inner ends of the plates, an adjustable strap having its opposite ends secured upon the plate connecting means, said plates having teeth formed upon their inner faces at their ends and along their longitudinal edges to receive the threaded portion of a cow's tail, and clamping means extending through the plates between their central portions and their inner ends for drawing said plates toward one another.

2. A cow tail holder comprising a pair of plates flared toward their outer ends, said plates having co-acting teeth formed upon their inner faces at their flared ends, a limb encircling strap having its opposite ends secured between the inner ends of said plates, the flared ends of the plates being normally spaced apart, and means extending through the plates forwardly of the ends of the strap for drawing together the flared ends of said plates.

In testimony whereof I hereunto affix my signature in the presence of two witnesses.

CLAYTON W. STEGNER.

Witnesses:
G. H. HILDEBRAND,
F. R. KAUFFMAN.

Copies of this patent may be obtained for five cents each, by addressing the "Commissioner of Patents, Washington, D. C."